United States Patent
Xu et al.

(10) Patent No.: US 10,950,933 B2
(45) Date of Patent: Mar. 16, 2021

(54) DECOUPLING ASSEMBLY, MULTIPLE-ANTENNA SYSTEM, AND TERMINAL

(71) Applicant: HUAWEI TECHNOLOGIES CO., LTD., Guangdong (CN)

(72) Inventors: Su Xu, Shenzhen (CN); Jun Wang, Hangzhou (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 51 days.

(21) Appl. No.: 16/263,923

(22) Filed: Jan. 31, 2019

(65) Prior Publication Data

US 2019/0165468 A1    May 30, 2019

Related U.S. Application Data

(63) Continuation of application No. PCT/CN2017/073811, filed on Feb. 16, 2017.

(30) Foreign Application Priority Data

Aug. 8, 2016 (CN) .......................... 201610648456.8

(51) Int. Cl.
*H01Q 1/24* (2006.01)
*H01Q 1/52* (2006.01)
(Continued)

(52) U.S. Cl.
CPC .............. *H01Q 1/523* (2013.01); *H01Q 1/38* (2013.01); *H01Q 1/521* (2013.01); *H01Q 1/525* (2013.01);
(Continued)

(58) Field of Classification Search
CPC ........ H01Q 1/523; H01Q 1/521; H01Q 17/00; H01Q 15/0086; H01Q 1/38; H01Q 1/525; H01Q 21/28
See application file for complete search history.

(56) References Cited

U.S. PATENT DOCUMENTS

2002/0101388 A1    8/2002    Ippolito
2007/0290941 A1    12/2007   Brown et al.
(Continued)

FOREIGN PATENT DOCUMENTS

CN    1768448 A        5/2006
CN    101160690 A      4/2008
(Continued)

OTHER PUBLICATIONS

Tang Ming-Chun et al, Mutual coupling suppressing based on a new type electric resonant SRRs in microstrip array. Acta Physica Sinica, vol. 59, No. 3, Mar. 2010, 6 pages.
(Continued)

*Primary Examiner* — Dieu Hien T Duong
(74) *Attorney, Agent, or Firm* — Womble Bond Dickinson (US) LLP

(57) ABSTRACT

Embodiments of the present invention provide a decoupling assembly, a multiple-antenna system, and a terminal, and relate to the field of communications technologies, to change a radiation direction of an electromagnetic wave, thereby achieving a decoupling effect in a relatively large frequency range. The multiple-antenna system includes a first antenna unit and a second antenna unit that are adjacent to each other. A decoupling assembly is disposed between the first antenna unit and the second antenna unit, and the decoupling assembly is made of an electromagnetic material with electrical (Continued)

anisotropy or electromagnetic bianisotropy, to reduce a coupling generated between the first antenna unit and the second antenna unit.

18 Claims, 11 Drawing Sheets

(51) Int. Cl.
    *H01Q 17/00*     (2006.01)
    *H01Q 15/00*     (2006.01)
    *H01Q 1/38*     (2006.01)
    *H01Q 21/28*     (2006.01)
    *H04M 1/02*     (2006.01)

(52) U.S. Cl.
    CPC ......... *H01Q 15/0086* (2013.01); *H01Q 17/00* (2013.01); *H01Q 21/28* (2013.01); *H01Q 1/24* (2013.01); *H04M 1/02* (2013.01)

(56) References Cited

U.S. PATENT DOCUMENTS

| | | | |
|---|---|---|---|
| 2009/0153433 A1* | 6/2009 | Nagai | H01Q 17/00 343/893 |
| 2010/0079217 A1 | 4/2010 | Morton et al. | |
| 2011/0175792 A1 | 7/2011 | Yoon et al. | |
| 2012/0274522 A1* | 11/2012 | Ayatollahi | H01Q 1/243 343/745 |
| 2013/0257674 A1* | 10/2013 | Li | H01O 5/378 343/853 |
| 2014/0313089 A1 | 10/2014 | Wu et al. | |
| 2015/0132557 A1 | 5/2015 | Durant et al. | |
| 2015/0288061 A1* | 10/2015 | Liu | H01Q 1/48 343/841 |
| 2016/0111779 A1* | 4/2016 | Ma | H01Q 1/521 343/841 |

FOREIGN PATENT DOCUMENTS

| | | |
|---|---|---|
| CN | 203607543 U | 5/2014 |
| CN | 104269614 A | 1/2015 |
| CN | 204558648 U | 8/2015 |
| JP | 2008-245132 A | 10/2008 |
| WO | 2011/090332 A2 | 7/2011 |

OTHER PUBLICATIONS

Zhang Hongxin et al, Application of metamaterials in antenna array. Chinese Journal of Radio Science, vol. 29, No. 4, Aug. 2014, 10 pages.

Abdolmehdi Dadgarpour et al: "Mutual Coupling Reduction in Dielectric Resonator Antennas Using Metasurface Shield for 60?GHz MIMO Systems", IEEE Antennas and Wireless Propagation Letters, vol. 16, Jan. 1, 2017,pp. 477-480, XP055600687.

Alkesh Agrawal et al: "A Multiband Metamaterial Absorber with Concentric Continuous Rings Resonator Structure", International Journal of Advances in Microwave Technology, May 1, 2016,pp. 5-9, XP055600693.

Bait-Suwailam M M et al: "Electromagnetic Coupling Reduction inHigh-Profile Monopole Antennas Using Single-Negative MagneticMetamaterials for MIMO Applications", IEEE Transactions on Antennas and Propagation, IEEE Service Center, Piscataway, NJ, US, vol. 58, No. 9, Sep. 1, 2010,pp. 2894-2902, XP011311459.

Kevin Buell et al: "Metamaterial Insulator Enabled 5uperdirectiveArray", IEEE Transactions on Antennas and Propagation, IEEE Service Center, Piscataway, NJ, US, vol. 55, No. 4, Apr. 1, 2007,pp. 1074-1085, XP011176477.

Maryam Ghaderi et al: "Frequency Selective Surface for reducing mutual coupling in antenna arrays", Microwave Conference Proceedings (APMC), 2011 Asia-Pacific, IEEE, Dec. 5, 2011, pp. 1877-1880, XP032153026.

Zhai Guohua et al: "Enhanced Isolation of a Closely Spaced Four-Element Mimo Antenna System Using Metamaterial Mushroom", IEEE Transactions on Antennas and Propagation, IEEE Service Center, Piscataway, NJ, US, vol. 63, No. 8, Aug. 1, 2015,pp. 3362-3370, XP011664734.

Abdolmehdi Dadgarpour et al.,"Mutual-Coupling suppression for 60 GHz MIMO Antenna using Metamaterials",2015 IEEE,total 2 pages.

Pere J. Ferrer et al.,"Bidirectional Metamaterial Separator for Compact Antenna Systems",2007 IEEE Antennas and Propagation Society International Symposium ,Jun. 9-15, 2007,total 4 pages.

Marc Imbert et al.,"Assessment of the Performance of a Metamaterial Spacer in a Closely Spaced Multiple-Antenna System",IEEE Antennas and Wireless Propagation Letters, vol. 11, 2012,total 4 pages.

* cited by examiner

DECOUPLING ASSEMBLY, MULTIPLE-ANTENNA SYSTEM, AND TERMINAL

CROSS-REFERENCE TO RELATED APPLICATIONS

This application is a continuation of International Application No. PCT/CN2017/073811, filed on Feb. 16, 2017, which claims priority to Chinese Patent Application No. 201610648456.8, filed on Aug. 8, 2016. The disclosures of the aforementioned applications are hereby incorporated by reference in their entireties.

TECHNICAL FIELD

Embodiments of the present invention relate to the field of communications technologies, and in particular, to a decoupling assembly, a multiple-antenna system, and a terminal.

BACKGROUND

Generally, to ensure communication quality, antennas at a receive end are mutually isolated during signal sending and receiving. However, for a receive end such as a mobile phone, a size of the receive end is usually strictly limited, and a plurality of antennas are concentrated in limited small space. Consequently, a relatively severe coupling is generated when different antennas perform radiation, and isolation between antennas is reduced.

Therefore, in the prior art, a decoupling network (for example, an LC decoupling circuit is added), a neutralization line, or a notch groove is usually established between antennas at a receive end, to neutralize a coupling current between the antennas, thereby achieving a decoupling effect.

However, a decoupling effect can be achieved only in one or more fixed frequency bands by using the foregoing decoupling method, and a corresponding decoupling network, neutralization line, or notch groove needs to be re-designed once a frequency band at which antennas work changes. For example, when the antennas work at a frequency band 1, a decoupling effect can be achieved by disposing a neutralization line with a width of D1 between the antennas. However, a decoupling effect may be achieved only in the frequency band 1 by using the neutralization line with the width of D1. As frequency bands at which antennas work in the future are increasing, the antennas may choose different frequency bands to receive and send signals. When the antennas work at a frequency band 2, a decoupling effect cannot be achieved by using the neutralization line with the width of D1.

SUMMARY

Embodiments of the present invention provide a decoupling assembly, a multiple-antenna system, and a terminal, to change a radiation direction of an electromagnetic wave, thereby achieving a decoupling effect in a relatively large frequency range.

The following technical solutions are used in the embodiments of the present invention to achieve the foregoing objective.

According to a first aspect, an embodiment of the present invention provides a multiple-antenna system, where the multiple-antenna system includes a first antenna unit and a second antenna unit that are adjacent to each other, a decoupling assembly is disposed between the first antenna unit and the second antenna unit, and the decoupling assembly is made of an electromagnetic material with electrical anisotropy or electromagnetic bianisotropy, to reduce a coupling generated between the first antenna unit and the second antenna unit.

When no decoupling assembly is disposed between the first antenna unit and the second antenna unit, the first antenna unit is used as an example, the first antenna unit may radiate an electromagnetic wave in a specific direction, and after entering free space, the electromagnetic wave in the direction has a consistent radiation difficulty degree in all directions. Therefore, there is an intersection between radiation regions of the two antenna units in space between the two antenna units, and a coupling is generated. Consequently, isolation between the antenna units is reduced. After the decoupling assembly is disposed between the first antenna unit and the second antenna unit, because the decoupling assembly has the electromagnetic bianisotropy or the electrical anisotropy, the decoupling assembly may change a radiation direction of an electromagnetic wave at a location of the decoupling assembly in a relatively large frequency range, to reduce energy that is of electromagnetic waves radiated by the first antenna unit and the second antenna unit and that is propagated towards a region in which the first antenna unit is located and a region in which the second antenna unit is located. Therefore, the intersection between the radiation regions generated by the two antenna units is reduced, in other words, the coupling between the first antenna unit and the second antenna unit is reduced, and a decoupling effect is achieved.

In one embodiment, the decoupling assembly includes N first decoupling units, where N is an integer greater than 0, the first decoupling unit includes an insulated dielectric substrate and at least on closed conductive ring disposed on the dielectric substrate, and a plane on which the closed conductive ring is located intersects with a ground plate on which the first antenna unit and the second antenna unit are disposed.

In one embodiment, a normal line of the closed conductive ring separately points to the first antenna unit and the second antenna unit.

In this case, a relative magnetic permeability of the first decoupling unit in a direction perpendicular to the dielectric substrate is far less than a relative magnetic permeability of the first decoupling unit in a direction parallel with the dielectric substrate, and a relative permittivity of the first decoupling unit in the direction perpendicular to the dielectric substrate is far less than a relative permittivity of the first decoupling unit in the direction parallel with the dielectric substrate. In other words, the first decoupling unit has significant electromagnetic bianisotropy. In addition, because the first decoupling unit has relatively small dispersion in a range from 1 GHz to 6 GHz, all equivalent electromagnetic parameters (relative magnetic permeabilities and relative permittivities in all directions) of the first decoupling unit in the range from 1 GHz to 6 GHz are relatively stable.

In one embodiment, two adjacent first decoupling units are in contact with each other, and a thickness of the dielectric substrate is less than a half of a dielectric wavelength, where the dielectric wavelength is a wavelength of an electromagnetic wave that is in the electromagnetic material and that is radiated by the first antenna unit during working, and a working frequency of the first antenna unit is greater than or equal to a working frequency of the second antenna unit.

In one embodiment, a gap is disposed between two adjacent first decoupling units, and a sum of a thickness of the dielectric substrate and a size of the gap is less than a half of a dielectric wavelength, where the dielectric wavelength is a wavelength of an electromagnetic wave that is in the electromagnetic material and that is radiated by the first antenna unit during working, and a working frequency of the first antenna unit is greater than or equal to a working frequency of the second antenna unit.

In one embodiment, any side length of the dielectric substrate is less than a half of the dielectric wavelength.

In this case, the first decoupling unit in the decoupling assembly may be approximately considered as a homogeneous electromagnetic medium.

In one embodiment, the dielectric substrate includes a first surface opposite to the first antenna unit and a second surface opposite to the second antenna unit, and the closed conductive ring is disposed on the first surface and/or the second surface.

In one embodiment, the decoupling assembly includes M second decoupling units, where M is an integer greater than 0, the second decoupling unit includes a first dielectric substrate and a second dielectric substrate that are disposed in parallel, a plane on which the first dielectric substrate is located intersects with a ground plate on which the first antenna unit and the second antenna unit are disposed, and a permittivity of the first dielectric substrate is different from a permittivity of the second dielectric substrate.

In one embodiment, a permittivity of the first antenna unit is equal to a permittivity of the second antenna unit, the permittivity of the first dielectric substrate is greater than the permittivity of the first antenna unit, and the permittivity of the second dielectric substrate is less than the permittivity of the first antenna unit.

In one embodiment, the first antenna unit and the second antenna unit each include an antenna bracket and a radiation body installed on the antenna bracket, and a gap is disposed between the radiation body and the decoupling assembly.

In one embodiment, the multiple-antenna system further includes the ground plate disposed opposite to the decoupling assembly.

In one embodiment, the multiple-antenna system includes a first antenna group and a second antenna group that are symmetrically disposed at two ends of the ground plate, the first antenna group includes a third antenna unit, the first antenna unit, the second antenna unit, and a fourth antenna unit that are sequentially arranged along an edge of the ground plate, and the decoupling assembly is disposed between the first antenna unit and the second antenna unit.

In one embodiment, the multiple-antenna system includes four antenna pairs disposed at four vertices of the ground plate, each antenna pair includes the first antenna unit and the second antenna unit, and the decoupling assembly is disposed between the first antenna unit and the second antenna unit.

According to a second aspect, an embodiment of the present invention provides a decoupling assembly, where the decoupling assembly is disposed between a first antenna unit and a second antenna unit that are adjacent to each other, and the decoupling assembly is made of an electromagnetic material with electrical anisotropy or electromagnetic bianisotropy, to reduce a coupling between the first antenna unit and the second antenna unit.

According to a third aspect, an embodiment of the present invention provides a terminal, where the terminal includes the multiple-antenna system according to any design of the first aspect.

In the present embodiment of the invention, names of the decoupling assembly, the multiple-antenna system, and the terminal constitute no limitation on devices themselves. In actual implementation, these devices may appear with other names, provided that functions of the devices are similar to those in the present embodiments of the invention, in other words, the devices fall within the scope of the claims of the present embodiment of the invention and equivalents thereof.

In addition, for technical effects brought by any design of the second aspect to the third aspect, refer to technical effects brought by different designs of the first aspect. Details are not described herein again.

These or other aspects of the present embodiments of the invention are more concise and comprehensible in descriptions of the following embodiments.

DESCRIPTION OF EMBODIMENTS

Figure 1:
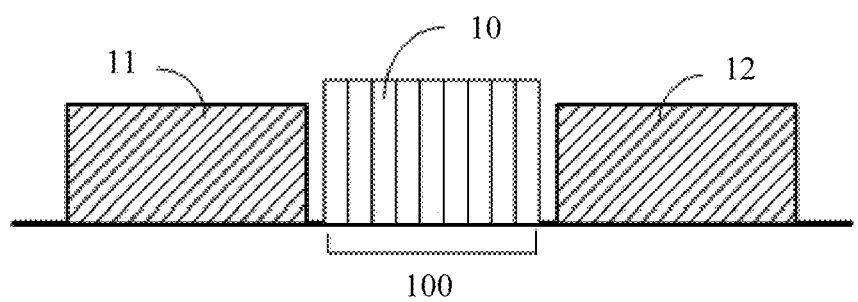
FIG. 1 is a first schematic diagram of an application scenario of a decoupling assembly according to an embodiment of the present invention.

The following describes the technical solutions in the embodiments of the present invention in detail with reference to the accompanying drawings in the embodiments of the present invention.

In addition, the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the description of the present embodiments of the invention, "a plurality of" means two or at least two unless otherwise stated.

An embodiment of the present invention provides a decoupling assembly. Specifically, the decoupling assembly may be disposed between a first antenna unit and a second antenna unit that are adjacent to each other. The decoupling assembly is made of an electromagnetic material with electrical anisotropy or electromagnetic bianisotropy, to reduce a coupling generated between the first antenna unit and the second antenna unit.

Anisotropy (anisotropy or anisotropic) means that components of a constitutive parameter (for example, a permittivity, or a magnetic permeability) of a substance for electromagnetic field propagation are not exactly the same in all directions. For example, the anisotropy may specifically include electrical anisotropy (to be specific, components of a permittivity are not exactly the same in all directions), magnetic anisotropy (to be specific, components of a magnetic permeability are not exactly the same in all directions), and electromagnetic bianisotropy (to be specific, components of a permittivity are not exactly the same in all directions, and components of a magnetic permeability are not exactly the same in all directions).

In other words, there is electrical anisotropy provided that a component of a permittivity in any direction is different from a component of the permittivity in another direction in terms of a numerical value; there is magnetic anisotropy provided that a component of a magnetic permeability in any direction is different from a component of the magnetic permeability in another direction in terms of a numerical value; and there is electromagnetic bianisotropy provided that a component of a permittivity in any direction is different from a component of the permittivity in another direction in terms of a numerical value and a component of a magnetic permeability in any direction is different from a component of the magnetic permeability in another direction in terms of a numerical value.

It should be noted that in a subsequent embodiment of the present invention, a relative permittivity and a relative magnetic permeability are used as equivalent electromagnetic parameters of the decoupling assembly to describe a decoupling principle of the decoupling assembly in detail.

The relative permittivity is a ratio of an original external electric field (in a vacuum) to an electric field in a medium, where the external electric field is weakened due to an induced charge generated when the medium is applied to the external electric field. In addition, a permittivity=the relative permittivity×a vacuum permittivity $\varepsilon_0$, where $\varepsilon_0 = 8.854187817 \times 10^{-12}$ F/m (an approximation). Similarly, a magnetic permeability=the relative magnetic permeability×a vacuum magnetic permeability $\mu_0$, where $\mu_0 = 4\pi \times 10^{-7}$ H/m (an approximation).

Specifically, when no decoupling assembly is disposed between the first antenna unit and the second antenna unit, the first antenna unit is used as an example, the first antenna unit may radiate an electromagnetic wave in a specific direction, and after entering free space (Free Space), the electromagnetic wave in the direction has a consistent radiation difficulty degree in all directions. Therefore, there is an intersection between radiation regions of the two antenna units in space between the two antenna units, and a free space coupling is generated. Consequently, isolation between the antenna units is reduced. After the decoupling assembly is disposed between the first antenna unit and the second antenna unit, because the decoupling assembly has the electromagnetic bianisotropy or the electrical anisotropy, the decoupling assembly may change radiation directions of electromagnetic waves generated by the first antenna unit and the second antenna unit at a location of the decoupling assembly, to reduce energy that is of the electromagnetic waves radiated by the first antenna unit and the second antenna unit and that is propagated towards a region in which the first antenna unit is located and a region in which the second antenna unit is located. Therefore, the intersection between the radiation regions generated by the two antenna units is reduced, in other words, the coupling between the first antenna unit and the second antenna unit is reduced, and a decoupling effect is achieved.

The free space is a definition in electromagnetism, and generally indicates a theoretically perfect vacuum. Sometimes, the free space indicates a reference medium for electromagnetic wave propagation. Free space in subsequent embodiments of the present invention uniformly indicates air.

In addition, the electromagnetic bianisotropy or the electrical anisotropy of the decoupling assembly is usually relatively stable in a relatively large frequency range. Therefore, the coupling generated between the first antenna unit and the second antenna unit can be reduced in the relatively large frequency range by using the foregoing decoupling method.

For example, FIG. 1 is a schematic diagram of an application scenario of a decoupling assembly 100 according to an embodiment of the present invention. The decoupling assembly 100 specifically includes N (N is an integer greater than 0) first decoupling units 10. The N first decoupling units 10 are stacked between a first antenna unit 11 and a second antenna unit 12.

Figure 2:
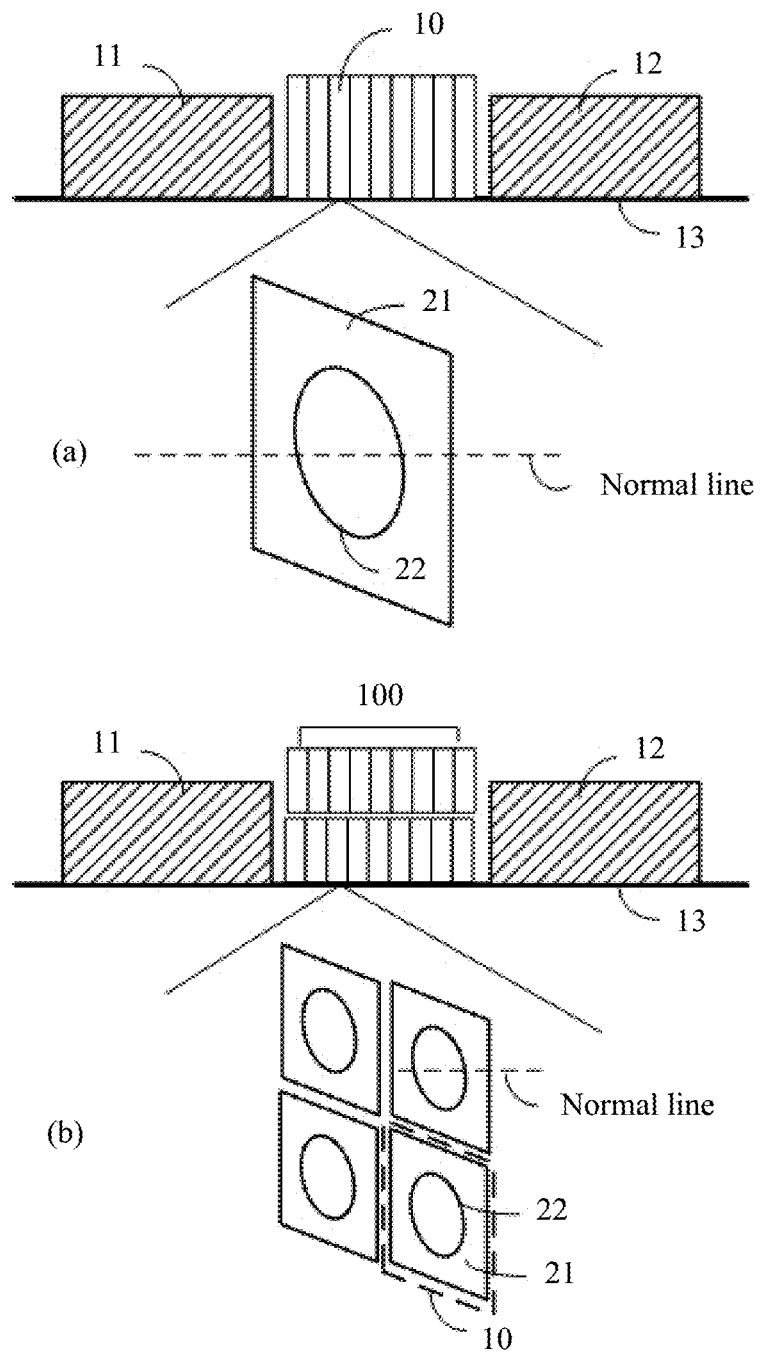
FIG. 2 is a first enlarged schematic diagram of a first decoupling unit according to an embodiment of the present invention.

A diagram (a) in FIG. 2 is an enlarged schematic diagram of any first decoupling unit 10 in FIG. 1. The first decoupling unit 10 has electromagnetic bianisotropy. The first decoupling unit 10 includes an insulated dielectric substrate 21 and at least one closed conductive ring 22 disposed on the dielectric substrate 21. In addition, a plane on which the closed conductive ring 22 is located intersects with a ground plate 13 on which the antenna unit 11 and the antenna unit 12 are disposed. In other words, the dielectric substrate 21 on which the closed conductive ring 22 is located cannot be in parallel or coincide with the ground plate 13.

For example, an angle between the plane on which the closed conductive ring 22 is located and the ground plate may be between 45° and 90°.

Preferably, as shown in the diagram (a) in FIG. 2, two ends of a normal line (a straight line perpendicular to the plane on which the closed conductive ring 22 is located) of the closed conductive ring 22 respectively point to the first antenna unit 11 and the second antenna unit 12. For example, the dielectric substrate 21 may be vertically disposed on the ground plate, and the closed conductive ring 22 on the dielectric substrate 21 is in parallel with a side surface of the first antenna unit 11 (or the second antenna unit 12). In this case, the two ends of the normal line of the closed conductive ring 22 respectively point to a center of the first antenna unit 11 and a center of the second antenna unit 12. Certainly, because the first antenna unit 11 and the second antenna unit 12 are stereoscopic, when the normal line of the closed conductive ring 22 separately points to any location of the first antenna unit 11 and the second antenna unit 12, it may be considered that the normal line of the closed conductive ring 22 separately points to the first antenna unit 11 and the second antenna unit 12.

The dielectric substrate 21 may be a plane, or may be a curved surface. This is not limited in this embodiment of the present invention.

In one embodiment, two adjacent first decoupling units 10 may be in contact with each other, or a specific gap may be disposed. When the two adjacent first decoupling units 10 are in contact with each other, a thickness of the dielectric substrate 21 may be less than a half of a dielectric wavelength (the dielectric wavelength is a wavelength of an electromagnetic wave that is in the electromagnetic material and that is radiated by an antenna unit such as the first antenna unit 11 with a relatively large working frequency when the antenna unit works at the working frequency), in other words, the thickness of the dielectric substrate 21 is within a subwavelength (Subwavelength) range. For example, the thickness of the dielectric substrate 21 may be one tenth of the dielectric wavelength, in other words, the thickness of the dielectric substrate 21 is within a deep subwavelength (Deep Subwavelength) range. When the specific gap is disposed between the two adjacent first decoupling units 10, a sum of a thickness of the dielectric substrate 21 and a size of the gap should be less than a half of a dielectric wavelength.

Similarly, any side length of the dielectric substrate 21 may also be less than a half of the dielectric wavelength. For example, any side length of the dielectric substrate 21 is one fifth of the dielectric wavelength.

In this case, the first decoupling unit 10 in the decoupling assembly 100 may be approximately considered as a homogeneous electromagnetic medium.

Alternatively, as shown in a diagram (b) in FIG. 2, J×K (both J and K are integers greater than 1) first decoupling units 10 may be disposed on a plane on which the dielectric substrate 21 is located. In this case, a plane on which a closed conductive ring 22 in each first decoupling unit 10 is located still intersects with the ground plate 13. In addition, a thickness of a dielectric substrate 21 in each first decoupling unit 10 may be still less than a half of a dielectric wavelength, and any side length of the dielectric substrate 21 may be still less than a half of the dielectric wavelength. Two adjacent first decoupling units 10 in the J×K first decoupling units 10 may be in contact with each other, or a specific gap may be disposed. This is not limited in this embodiment of the present invention.

For example, each of 2×2 first decoupling units 10 shown in the diagram (b) in FIG. 2 is a square. Assuming that a side length of each first decoupling unit 10 is a quarter of the dielectric wavelength, and no gap is disposed between adjacent first decoupling units 10, a side length of a rectangle including the 2×2 first decoupling units 10 is equal to a half of the dielectric wavelength. Assuming that a side length of each first decoupling unit 10 is a quarter of the dielectric wavelength, and a gap is disposed between adjacent first decoupling units 10, a side length of a rectangle including the 2×2 first decoupling units 10 is greater than a half of the dielectric wavelength. Still alternatively, assuming that a side length of each first decoupling unit 10 is one tenth of the dielectric wavelength, and no gap is disposed between adjacent first decoupling units 10, a side length of a rectangle including the 2×2 first decoupling units 10 is one fifth of the dielectric wavelength, and is less than a half of the dielectric wavelength.

Figure 3:
FIG. 3 is a second enlarged schematic diagram of a first decoupling unit according to an embodiment of the present invention.

In addition, as shown in FIG. 3, the dielectric substrate 21 may specifically include a first surface 201 opposite to the first antenna unit 11 and a second surface 202 opposite to the second antenna unit 12. The closed conductive ring 22 may be disposed on the first surface 201, may be disposed on the second surface 202, or may be disposed on both of the first surface 201 and the second surface 202. This is not limited in this embodiment of the present invention.

Figure 4:
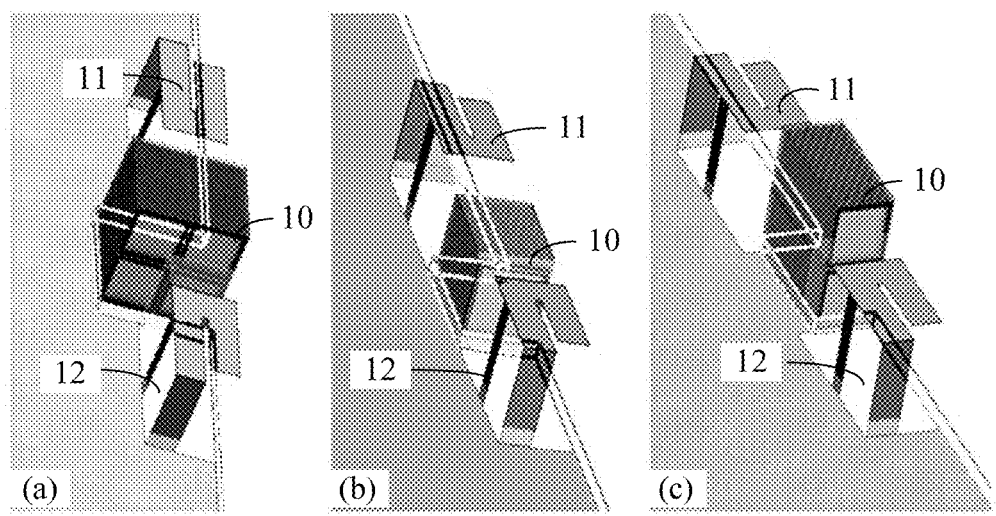
FIG. 4 is a second schematic diagram of an application scenario of a decoupling assembly according to an embodiment of the present invention.

Further, as shown in FIG. 4, there may be one or more closed conductive rings 22 in one first decoupling unit 10. The closed conductive ring 22 may be in any closed shape such as a rectangle, a circle, or an ellipse, to construct a closed magnetic flux loop, thereby implementing electromagnetic bianisotropy. In addition, a cross-sectional area of the closed conductive ring 22 may be consistent with a size of the first antenna unit 11 (or the second antenna unit 12), or may be greater than or less than a size of the first antenna unit 11 (or the second antenna unit 12). This is not limited in this embodiment of the present invention. As shown in a diagram (a) in FIG. 4, one first decoupling unit 10 includes four closed conductive rings 22, and both a width and a height of the first decoupling unit 10 are greater than a width and a height of a cross section of the first antenna unit 11 (or the second antenna unit 12). As shown in a diagram (b) in FIG. 4, one first decoupling unit 10 includes one closed conductive ring 22, and a width of the first decoupling unit 10 is equal to a width of a cross section of the first antenna unit 11 (or the second antenna unit 12), but a height of the first decoupling unit 10 is less than a height of the cross section of the first antenna unit 11 (or the second antenna unit 12). Still alternatively, as shown in a diagram (c) in FIG. 4, one first decoupling unit 10 includes two closed conductive rings 22, and a width of the first decoupling unit 10 is slightly less than a width of a cross section of the first antenna unit 11 (or the second antenna unit 12), but a height of the first decoupling unit 10 is greater than a height of the cross section of the first antenna unit 11 (or the second antenna unit 12).

It should be noted that the N first decoupling units 10 disposed between the first antenna unit 11 and the second antenna unit 12 may be in contact with each other, or a specific gap may be disposed. In addition, a volume of the N first decoupling units 10 may be less than, greater than, or equal to a size of space between the first antenna unit 11 and the second antenna unit 12. This is not limited in this embodiment of the present invention.

Based on any one of the foregoing decoupling assemblies 100, an embodiment of the present invention further provides a multiple-antenna system. The system includes at least a first antenna unit 11 and a second antenna unit 12 that are adjacent to each other. Any one of the foregoing decoupling assemblies 100 is disposed between the first antenna unit 11 and the second antenna unit 12, to reduce a coupling generated between the first antenna unit 11 and the second antenna unit 12.

The first antenna unit 11 and the second antenna unit 12 each include an antenna bracket and a radiation body installed on the antenna bracket. The radiation body may radiate an electromagnetic wave at a specific working frequency, so that the first antenna unit 11 and the second antenna unit 12 receive and send data by using the electromagnetic wave radiated by the radiation body as a carrier.

For example, the radiation body may be a PIFA (Planar Inverted F Antenna, planar inverted F antenna), a PILA (Planar Inverted L Antenna, planar inverted L antenna), an IFA (Inverted F Antenna, inverted F antenna), an ILA (Inverted L Antenna, inverted L antenna), a monopole antenna (monopole antenna), a loop antenna (loop antenna), or the like. This is not limited in this embodiment of the present invention.

In addition, a gap may be disposed between the radiation body and the decoupling assembly 100. In other words, the radiation body is not in direct contact with a closed conductive ring 22 in the decoupling assembly 100, to avoid a short circuit between the decoupling assembly 100 and the radiation body.

Figure 5:
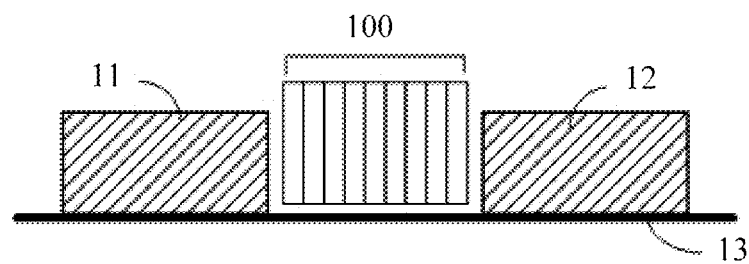
FIG. 5 is a first schematic structural diagram of a multiple-antenna system according to an embodiment of the present invention.

Further, as shown in FIG. 5, the multiple-antenna system may further include a ground plate 13 disposed opposite to the decoupling assembly 100. The ground plate 13 may be in contact with the decoupling assembly 100, or a specific gap may be disposed between the ground plate 13 and the decoupling assembly 100.

The following uses a multiple-antenna system including two antenna units in FIG. 5 as an example to explain a decoupling principle of the decoupling assembly 100 provided in this embodiment of the present invention.

For example, as shown in FIG. 5, a plurality of first decoupling units 10 are filled between the first antenna unit 11 and the second antenna unit 12. It is assumed that sizes of the first antenna unit 11 and the second antenna unit 12 are 8.2 mm×5 mm×4 mm (a length×a width×a height), and a distance between the first antenna unit 11 and the second antenna unit 12 is 5 mm. A dielectric substrate 21 in each first decoupling unit 10 is a polytetrafluoroethylene glass cloth dielectric substrate (a relative permittivity of the polytetrafluoroethylene glass cloth dielectric substrate is 2.55), and a size of the dielectric substrate 21 is 5 mm×5 mm×0.25 mm. A closed metal square conductive ring 22 with a side length of 4.7 mm and a line width of 0.15 mm is printed on one side of the dielectric substrate 21, and a normal line of the closed conductive ring 22 points to the first antenna unit 11 and the second antenna unit 12.

A thickness of the dielectric substrate 21 is 0.25 mm, and the thickness is far less than a half of a dielectric wavelength. Therefore, the first decoupling unit 10 may be equivalent to a homogeneous electromagnetic medium. In a range from 1 GHz to 6 GHz, the first decoupling unit 10 has relatively small dispersion, and equivalent electromagnetic parameters of the first decoupling unit 10 are $\mu_\perp \approx 0.13$, $\mu_\| \approx 1$, $\varepsilon_\perp \approx 2.55$, and $\varepsilon_\| \approx 32$, where $\mu$ is a relative magnetic permeability, $\varepsilon$ is a relative permittivity, $\mu_\perp$ is a relative magnetic permeability of the first decoupling unit 10 in a direction perpendicular to the dielectric substrate 21, and $\mu_\|$ is a relative magnetic permeability of the first decoupling unit 10 in a direction parallel with the dielectric substrate 21. Similarly, $\varepsilon_\perp$ is a relative permittivity of the first decoupling unit 10 in the direction perpendicular to the dielectric substrate 21, and $\varepsilon_\|$ is a relative permittivity of the first decoupling unit 10 in the direction parallel with the dielectric substrate 21.

It can be seen that in the first decoupling unit 10 shown in FIG. 5, the relative magnetic permeability $\mu_\perp$ of the first decoupling unit 10 in the direction perpendicular to the dielectric substrate 21 is far less than the relative magnetic permeability $\mu_\|$ of the first decoupling unit 10 in the direction parallel with the dielectric substrate 21, and the relative permittivity $\varepsilon_\perp$ of the first decoupling unit 10 in the direction perpendicular to the dielectric substrate 21 is far less than the relative permittivity $\varepsilon_\|$ of the first decoupling unit 10 in the direction parallel with the dielectric substrate 21. In other words, the first decoupling unit 10 has significant electromagnetic bianisotropy. In addition, because the first decoupling unit 10 has relatively small dispersion in the range from 1 GHz to 6 GHz, all the equivalent electromagnetic parameters ($\mu_\perp$, $\mu_\|$, $\varepsilon_\perp$, and $\varepsilon_\|$) of the first decoupling unit 10 in the range from 1 GHz to 6 GHz are relatively stable.

Because the first decoupling unit 10 has the electromagnetic bianisotropy in a relatively large frequency range, the first decoupling unit 10 has a function of changing radiation directions of the first antenna unit 11 and the second antenna unit 12.

Figure 6:
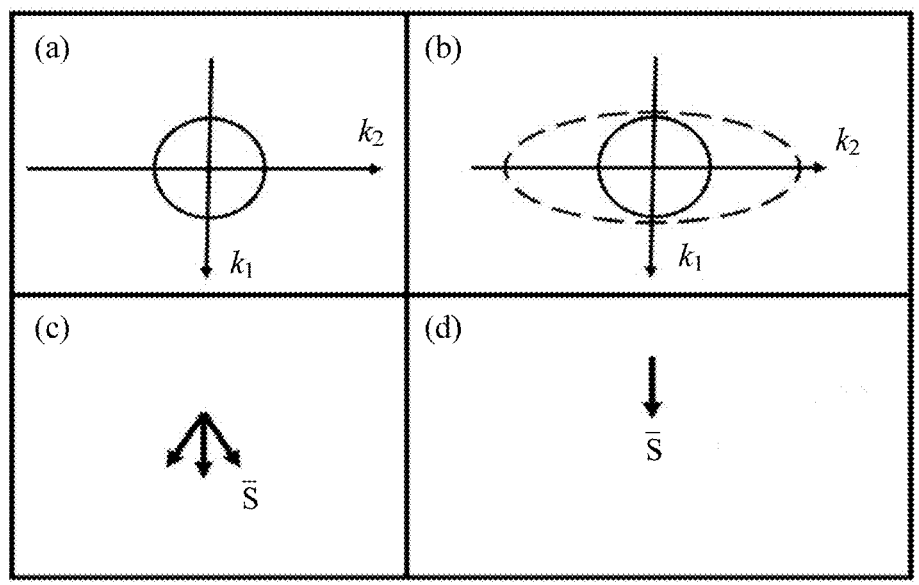
FIG. 6 is a schematic diagram of a decoupling principle according to an embodiment of the present invention.

This is because, as shown in a diagram (a) in FIG. 6, if the decoupling assembly 100 with the electromagnetic bianisotropy is not disposed between the first antenna unit 11 and the second antenna unit 12, the first antenna unit 11 is used as an example, substances around the first antenna unit 11 are air (or may be referred to as free space), and a dispersion curve of the air is in a circular shape on a plane, which indicates that after the first antenna unit 11 radiates an electromagnetic wave in a specific direction, the electromagnetic wave has a consistent radiation difficulty degree in all directions in the free space. In this case, as shown in a diagram (c) in FIG. 6, the electromagnetic wave radiated by the first antenna unit 11 may be radiated in different directions. Consequently, there is an intersection between the radiation directions of the first antenna unit 11 and the second antenna unit 12 that are adjacent to each other, and a relatively large coupling is generated.

If the decoupling assembly 100 is filled between the first antenna unit 11 and the second antenna unit 12, as shown in a diagram (b) in FIG. 6, in this case, a dispersion curve of the decoupling assembly 100 in a region between the first antenna unit 11 and the second antenna unit 12 is in an elliptical shape on a plane, and a propagation direction of an electromagnetic wave in the region is shown in a diagram (d) in FIG. 6, to be specific, propagation of the electromagnetic wave in the region is limited to some extent, and the electromagnetic wave is mainly propagated in a direction of a minor axis of the ellipse in the diagram (b) in FIG. 6, and the direction of the minor axis of the ellipse is a direction perpendicular to the normal line of the closed conductive ring 22 in FIG. 2. Therefore, in this case, the intersection between the radiation directions of the first antenna unit 11 and the second antenna unit 12 is reduced, thereby reducing a coupling between the first antenna unit 11 and the second antenna unit 12, and implementing a decoupling effect.

Figure 7:
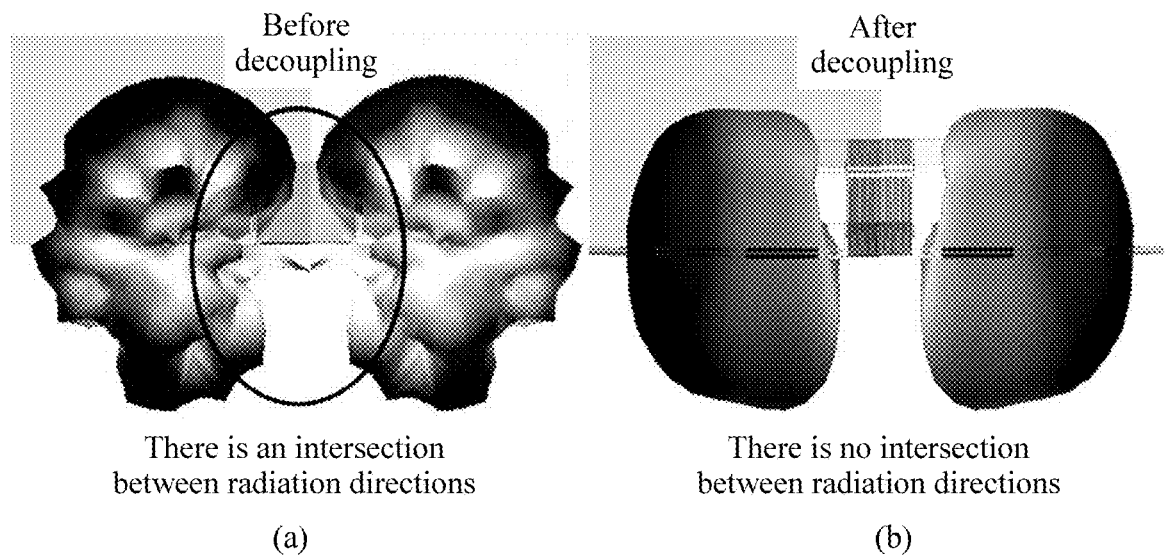
FIG. 7 is a schematic diagram of a comparison between antenna radiation directions of a first antenna unit and a second antenna unit before decoupling and antenna radiation directions of the first antenna unit and the second antenna unit after decoupling according to an embodiment of the present invention.

Further, FIG. 7 is a schematic diagram of a comparison between antenna radiation directions of a first antenna unit 11 and a second antenna unit 12 before decoupling and antenna radiation directions of the first antenna unit 11 and the second antenna unit 12 after decoupling. As shown in a diagram (a) in FIG. 7, before decoupling, there is an intersection between radiation directions of the first antenna unit 11 and the second antenna unit 12, and the two antenna units perform radiation towards each other. As a result, a coupling is generated. After a decoupling assembly 100 is added between the first antenna unit 11 and the second antenna unit 12, there is almost no intersection between radiation directions of the first antenna unit 11 and the second antenna unit 12, and the two antenna units do not perform radiation towards each other, thereby reducing a coupling between the first antenna unit 11 and the second antenna unit 12.

Figure 8:
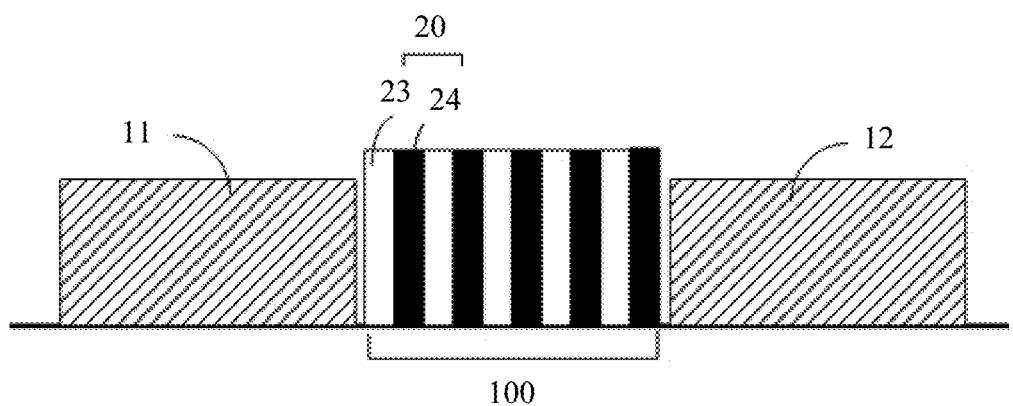
FIG. 8 is a third schematic diagram of an application scenario of a decoupling assembly according to an embodiment of the present invention.

Still alternatively, FIG. 8 is a schematic diagram of another application scenario of a decoupling assembly 100 according to an embodiment of the present invention. The decoupling assembly 100 specifically includes M (M is an integer greater than 0) second decoupling units 20. The M second decoupling units 20 are also stacked between a first antenna unit 11 and a second antenna unit 12.

Different from the first decoupling unit 10 shown in FIG. 1, the second decoupling unit 20 has electrical anisotropy. Still as shown in FIG. 8, the second decoupling unit 20 includes a first dielectric substrate 23 and a second dielectric substrate 24 that are disposed in parallel. A plane on which the first dielectric substrate 23 is located intersects with a ground plate 13 on which the first antenna unit 11 and the second antenna unit 12 are disposed.

A relative permittivity of the first dielectric substrate 23 is different from a relative permittivity of the second dielectric substrate 24.

In one embodiment, when a relative permittivity of the first antenna unit 11 is equal to a relative permittivity of the second antenna unit 12, the relative permittivity of the first dielectric substrate 23 is greater than the relative permittivity of the first antenna unit 11, and the relative permittivity of the second dielectric substrate 24 is less than the relative permittivity of the first antenna unit 11.

Further, to enable the second decoupling unit 20 to be approximately considered as a homogeneous electromagnetic medium, similar to the first decoupling unit 10, a sum of a thickness of the first dielectric substrate 23 and a thickness of the second dielectric substrate 24 may be set to be less than a half of a dielectric wavelength.

Preferably, the sum of the thickness of the first dielectric substrate 23 and the thickness of the second dielectric substrate 24 may be set to be less than one fifth of the dielectric wavelength.

For example, still as shown in FIG. 8, a plurality of second decoupling units 20 are filled between the first antenna unit 11 and the second antenna unit 12. It is assumed that sizes of the first antenna unit 11 and the second antenna unit 12 are 10 mm×5 mm×5 mm, both the relative permittivity of the first antenna unit 11 and the relative permittivity of the second antenna unit 12 are 4.4, and a distance between the first antenna unit 11 and the second antenna unit 12 is 8 mm. Each second decoupling unit 20 includes a first dielectric substrate 23 and a second dielectric substrate 24, a relative permittivity of the first dielectric substrate 23 is 2.55, a relative permittivity of the second dielectric substrate 24 is 40, and both a size of the first dielectric substrate 23 and a size of the second dielectric substrate 24 are 5 mm×5 mm×0.5 mm.

In this case, equivalent electromagnetic parameters of the second decoupling unit 20 are $\varepsilon_\perp \approx 4.8$, and $\varepsilon_\parallel \approx 21.3$. It can be seen that a relative permittivity $\varepsilon_\perp$ of the second decoupling unit 20 in a direction perpendicular to the first dielectric substrate 23 is far less than a relative permittivity $\varepsilon_\parallel$ of the second decoupling unit 20 in a direction parallel with the first dielectric substrate 23, and the second decoupling unit 20 has a same relative magnetic permeability in all directions. In other words, the second decoupling unit 20 has significant electrical anisotropy.

Similar to FIG. 6, after the second decoupling unit 20 is filled between the first antenna unit 11 and the second antenna unit 12, propagation of electromagnetic waves generated by the first antenna unit 11 and the second antenna unit 12 is limited to some extent in a region in which the second decoupling unit 20 is filled. In this case, an intersection between radiation directions of the first antenna unit 11 and the second antenna unit 12 is reduced, thereby reducing a coupling between the first antenna unit 11 and the second antenna unit 12, and implementing a decoupling effect.

Based on the decoupling principle for the multiple-antenna system that includes two antenna units, the decoupling principle provided in this embodiment of the present invention may be further applied to a multiple-antenna system that includes more than two antenna units, for example, a MIMO (Multiple-Input Multiple-Output, multiple-input multiple-output) antenna system.

The following separately describes, by using the foregoing decoupling principle, design manners of implementing decoupling for the following two multiple-antenna systems that include eight antenna units.

Embodiment 1

Figure 9:
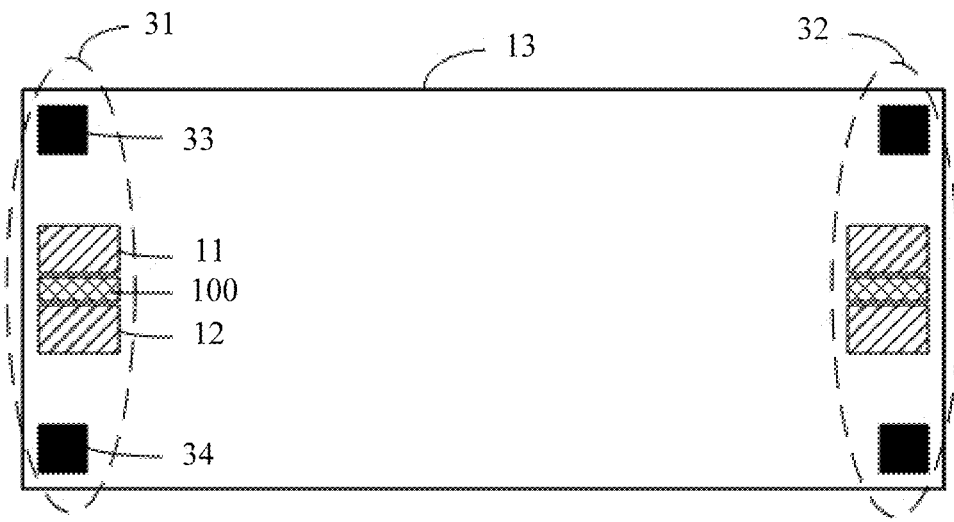
FIG. 9 is a second schematic structural diagram of a multiple-antenna system according to an embodiment of the present invention.

An embodiment of the present invention provides a multiple-antenna system. As shown in FIG. 9, the system includes a first antenna group 31 and a second antenna group 32 that are symmetrically disposed at two ends of a ground plate 13.

The first antenna group 31 is used as an example. The first antenna group 31 includes a third antenna unit 33, a first antenna unit 11, a second antenna unit 12, and a fourth antenna unit 34 that are sequentially arranged along an edge of the ground plate 13. Similarly, the second antenna group 32 and the first antenna group 31 are symmetrically disposed. Therefore, details are not described herein again.

Any one of the foregoing decoupling assemblies 100 is disposed between the first antenna unit 11 and the second antenna unit 12, to reduce a coupling generated between the first antenna unit 11 and the second antenna unit 12.

For example, the ground plate 13 includes an FR-4 epoxy glass cloth laminated board and a metal copper sheet printed on one side of the FR-4 epoxy glass cloth laminated board. A size of the FR-4 epoxy glass cloth laminated board is 136 mm×68 mm, a thickness is 1 mm, and a relative permittivity of the FR-4 epoxy glass cloth laminated board is about 4.4. In the first antenna group 31, both a size of the third antenna unit 33 and a size of the fourth antenna unit 34 are 4.2 mm×4.2 mm×1.6 mm, and both a size of the first antenna unit 11 and a size of the second antenna unit 12 are 8.2 mm×5 mm×4 mm. It can be seen that a distance between the first antenna unit 11 and the second antenna unit 12 is 5 mm, and is within a subwavelength range. Therefore, a coupling is easily generated between the first antenna unit 11 and the second antenna unit 12.

As shown in FIG. 9, the decoupling assembly 100 may be disposed between the first antenna unit 11 and the second antenna unit 12. The decoupling assembly 100 includes a plurality of first decoupling units 10 shown in FIG. 2. A dielectric substrate 21 in the first decoupling unit 10 may be a polytetrafluoroethylene glass cloth dielectric substrate (a relative permittivity of the polytetrafluoroethylene glass cloth dielectric substrate is 2.55), and a size of the dielectric substrate 21 is 5 mm×5 mm×0.25 mm. A closed metal square conductive ring 22 with a side length of 4.7 mm and a line width of 0.15 mm is printed on one side of the dielectric substrate 21, and a normal line of the closed conductive ring 22 separately points to the first antenna unit 11 and the second antenna unit 12.

Figure 10:
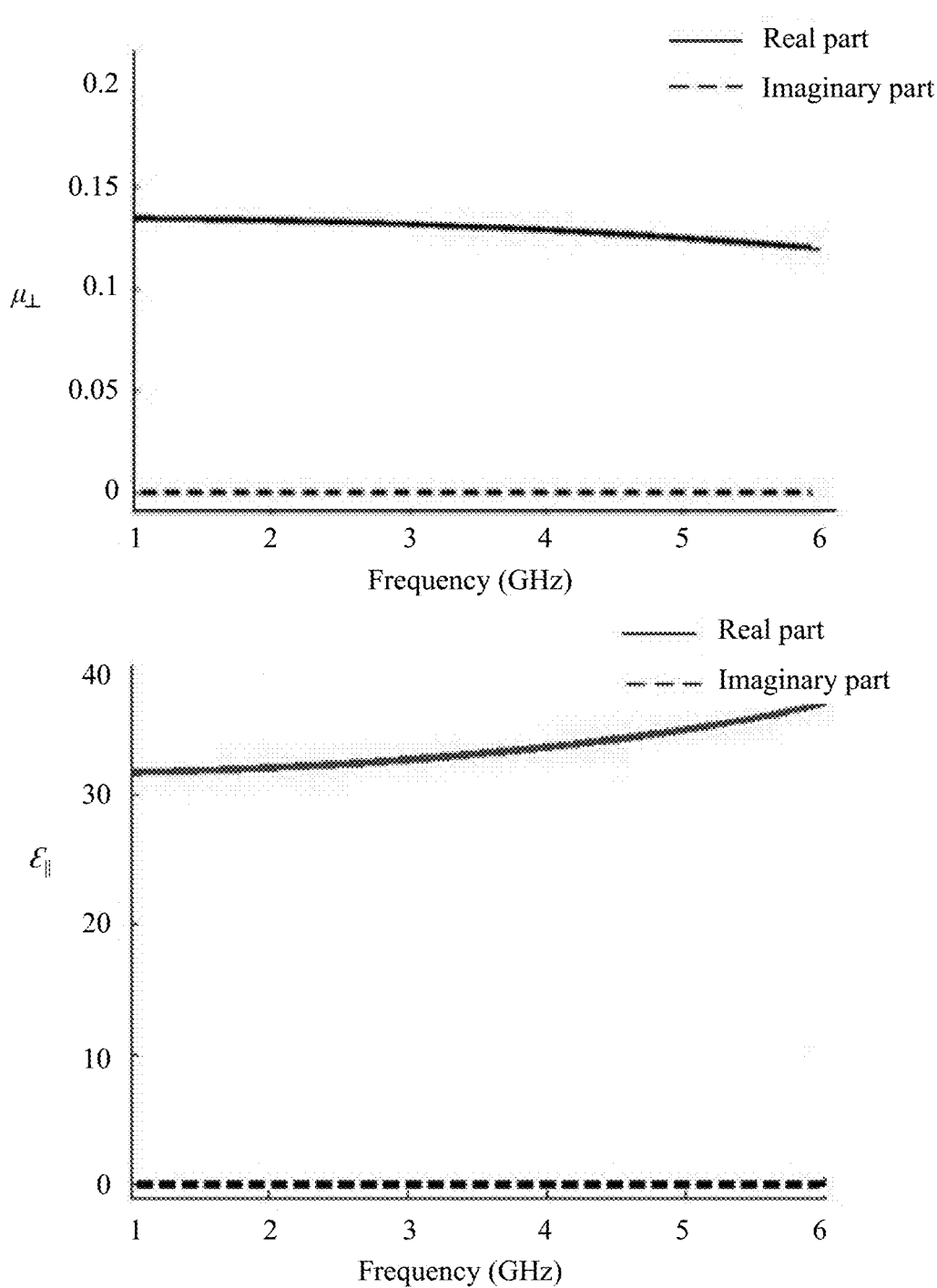
FIG. 10 is a schematic diagram of changes of an equivalent relative magnetic permeability and an equivalent relative permittivity of a first decoupling unit according to an embodiment of the present invention.

In this case, in a frequency range from 1 GHz to 6 GHz, an equivalent relative magnetic permeability $\mu_\parallel$ of the first decoupling unit 10 approaches 1, an equivalent relative permittivity $\varepsilon_\perp$ is approximately equal to 2.55, and values of $\mu_\perp$ and $\varepsilon_\parallel$ are shown in FIG. 10. A value of a real part of $\mu_\perp$ is between 0.1 and 0.15, and a value of an imaginary part of $\mu_\perp$ approaches 0. Correspondingly, a value of a real part of $\varepsilon_\parallel$ is greater than 30, and a value of an imaginary part of $\varepsilon_\parallel$ approaches 0. In other words, the first decoupling unit 10 has significant electromagnetic bianisotropy in the frequency range from 1 GHz to 6 GHz.

It should be noted that most materials in natural world are generally isotropic. Therefore, a relative permittivity and a relative magnetic permeability of the material may be represented by using constants at each fixed frequency.

However, when an anisotropic material is used, for example, for the first decoupling unit 10, a relative permittivity and a relative magnetic permeability of the first decoupling unit 10 may be represented by using a tensor (tensor). In addition, regardless of an isotropic material or an anisotropic material, a ratio of an imaginary part of a relative permittivity to a real part of the relative permittivity of the isotropic material or the anisotropic material may be defined as a loss tangent (loss tangent), and may be used to indicate a loss of the material.

In a design of a multiple-antenna system, a material with a relatively low loss is preferably selected. This is because once an electromagnetic wave is propagated by using a material with a relatively large loss, a part of energy radiated by an antenna unit is lost in the material, and consequently, radiation efficiency of the antenna unit is reduced.

However, in the foregoing embodiment, because the imaginary part of the relative permittivity $\varepsilon_\parallel$ approaches 0, a value of a loss tangent corresponding to the imaginary part approaches 0. Therefore, an electromagnetic wave radiated by the antenna unit has a very small loss, and adverse impact on radiation efficiency of the antenna unit may be reduced.

Figure 11:
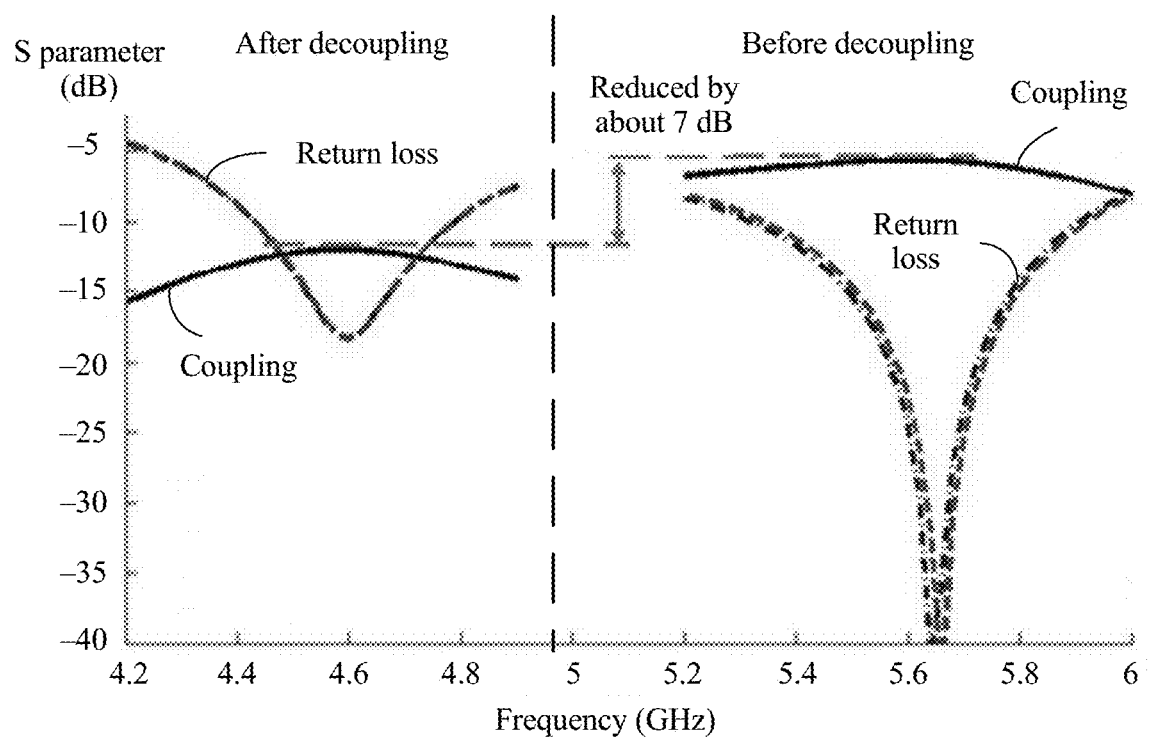
FIG. 11 is a schematic diagram of a comparison between S parameters of a first antenna unit and a second antenna unit before decoupling and S parameters of the first antenna unit and the second antenna unit after decoupling according to an embodiment of the present invention.

After the multiple-antenna system of the foregoing structure is simulated, simulation results of a return loss and a coupling between the first antenna unit 11 and the second antenna unit 12 in the first antenna group 31 may be obtained. FIG. 11 is a schematic diagram of a comparison between S parameters (S parameter, scattering parameter) of a first antenna unit 11 and a second antenna unit 12 before decoupling and S parameters of the first antenna unit 11 and the second antenna unit 12 after decoupling. It can be seen that the coupling between the first antenna unit 11 and the second antenna unit 12 is greater than −10 dB before decoupling, but the coupling between the first antenna unit 11 and the second antenna unit 12 is less than −10 dB after decoupling. Therefore, the coupling is reduced by about 7 dB. In addition, a return loss between the first antenna unit 11 and the second antenna unit 12 is less than −10 dB in a corresponding frequency band after decoupling.

Figure 12:
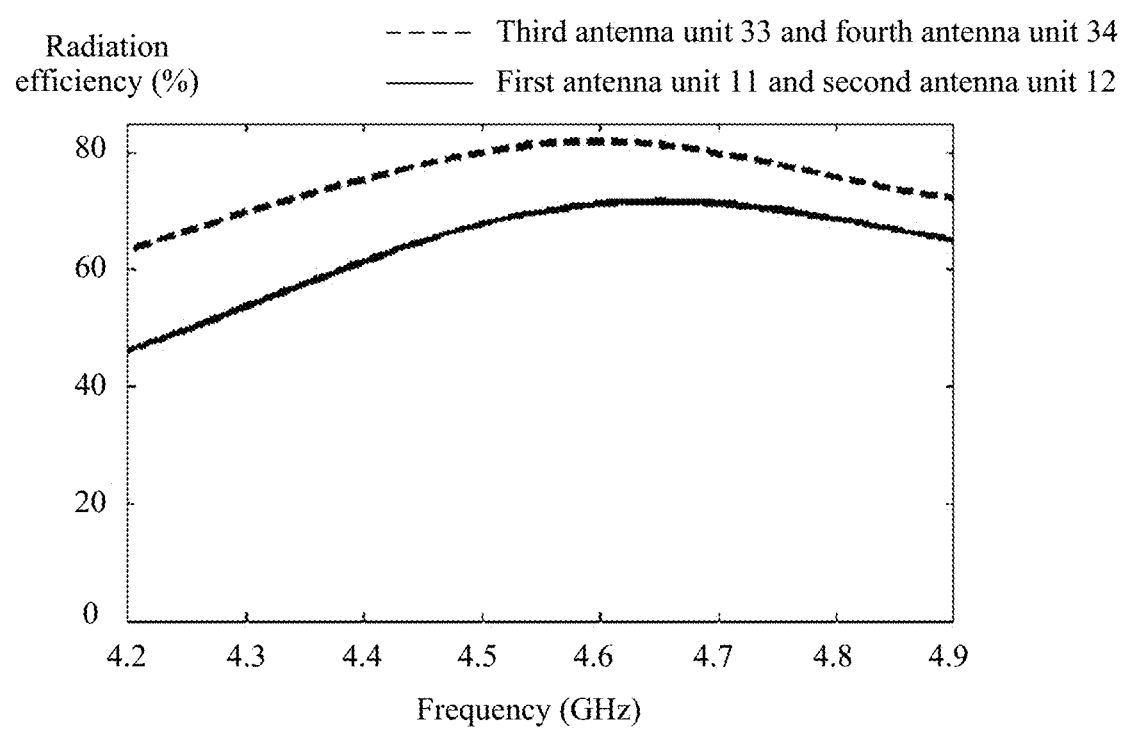
FIG. 12 is a schematic diagram of radiation efficiency of antenna units in a first antenna group before decoupling and radiation efficiency of the antenna units in the first antenna group after decoupling according to an embodiment of the present invention.

Further, because the coupling between the first antenna unit 11 and the second antenna unit 12 is reduced, radiation efficiency of each antenna unit in the first antenna group may be improved. As shown in FIG. 12, radiation efficiency of each antenna unit exceeds 50% in a frequency band range from 4.25 GHz to 4.9 GHz.

It can be seen that for the single-band multiple-antenna system shown in FIG. 9, the decoupling assembly 100 is disposed between the first antenna unit and the second antenna unit, so that a coupling between adjacent antenna units can be effectively reduced in a relatively large frequency range, thereby improving radiation efficiency of the antenna units.

Embodiment 2

Figure 13:
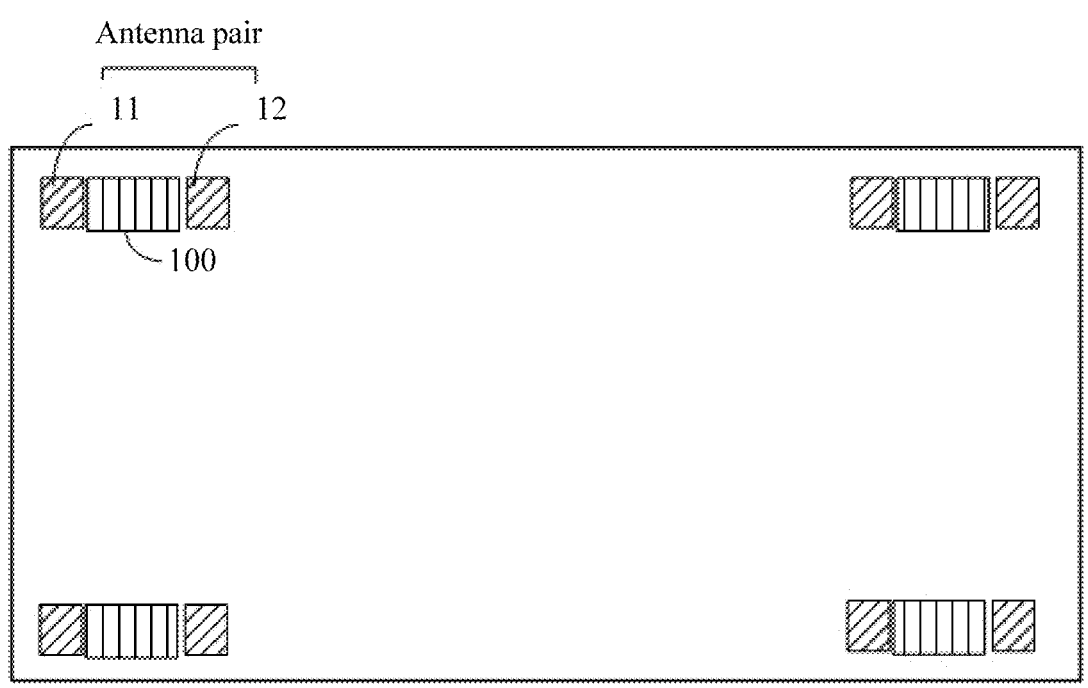
FIG. 13 is a third schematic structural diagram of a multiple-antenna system according to an embodiment of the present invention.

An embodiment of the present invention provides a multiple-antenna system. As shown in FIG. 13, the system includes four antenna pairs disposed at four vertices of a ground plate 13.

Each antenna pair includes a first antenna unit 11 and a second antenna unit 12. Any one of the foregoing decoupling assemblies 100 is disposed between the first antenna unit 11 and the second antenna unit 12, to reduce a coupling generated between the first antenna unit 11 and the second antenna unit 12.

For example, the ground plate 13 includes an FR-4 epoxy glass cloth laminated board and a metal copper sheet printed on one side of the FR-4 epoxy glass cloth laminated board. A size of the FR-4 epoxy glass cloth laminated board is 136 mm×68 mm, a thickness is 1 mm, and a relative permittivity of the FR-4 epoxy glass cloth laminated board is about 4.4. In each antenna pair, both a size of the first antenna unit 11 and a size of the second antenna unit are 5 mm×5 mm×2.5 mm, a size of a gap between the first antenna unit 11 and the second antenna unit 12 is 16 mm, and the size of the gap is within a subwavelength range. In this case, there is a relatively large coupling between the first antenna unit 11 and the second antenna unit 12. Consequently, radiation efficiency of the first antenna unit 11 and the second antenna unit 12 is affected.

Therefore, the decoupling assembly 100 may be disposed between the first antenna unit 11 and the second antenna unit 12. The decoupling assembly 100 includes a plurality of first decoupling units 10 shown in FIG. 2. A size of a dielectric substrate 21 in the first decoupling unit 10 is 7 mm×7 mm×0.25 mm, and the first dielectric substrate 21 is a polytetrafluoroethylene glass cloth dielectric substrate (a relative permittivity of the polytetrafluoroethylene glass cloth dielectric substrate is 2.55). A closed metal square conductive ring 22 with a side length of 6.6 mm and a line width of 0.15 mm is printed on one side of the dielectric substrate 21, and a normal line of the closed conductive ring 22 separately points to the first antenna unit 11 and the second antenna unit 12.

Figure 14:
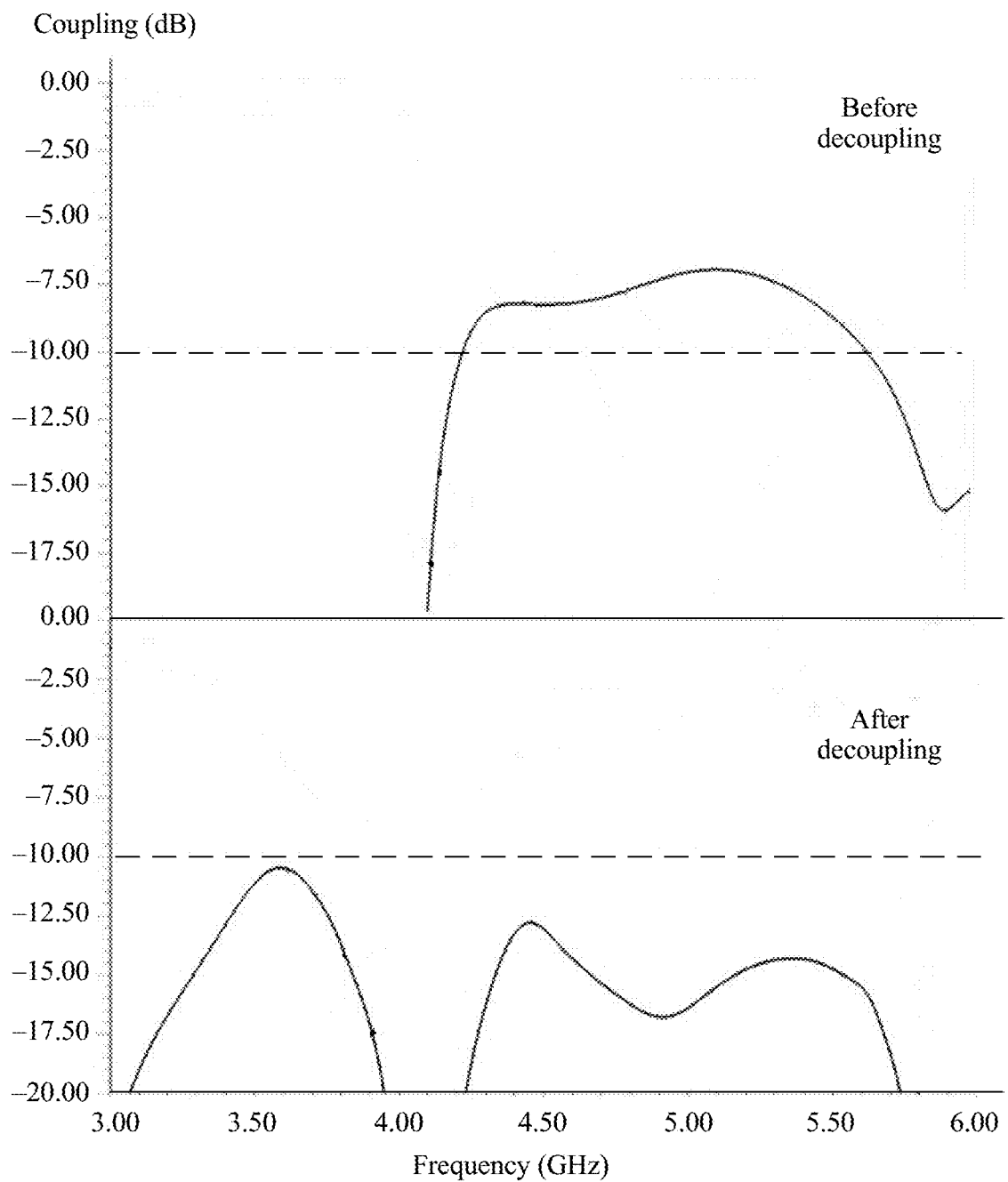
FIG. 14 is a schematic diagram of a comparison between a coupling generated between a first antenna unit and a second antenna unit before decoupling and a coupling generated between the first antenna unit and the second antenna unit after decoupling according to an embodiment of the present invention.

After the multiple-antenna system of the foregoing structure is simulated, any antenna pair is used as an example, as shown in FIG. 14, when no decoupling assembly 100 is disposed between the first antenna unit 11 and the second antenna unit 12, the coupling between the first antenna unit 11 and the second antenna unit 12 is greater than −10 dB in a frequency band range from 4.23 GHz to 5.58 GHz. Consequently, the radiation efficiency of the first antenna unit 11 and the second antenna unit 12 is greatly reduced. After the decoupling assembly 100 is disposed between the first antenna unit 11 and the second antenna unit 12, the coupling between the first antenna unit 11 and the second antenna unit 12 is less than −10 dB in all frequency bands. As shown in FIG. 14, the decoupling assembly 100 can reduce the coupling from −7.5 dB to −14 dB in a relatively large frequency range (from 3 GHz to 6 GHz), and a reduction amplitude is about 6.5 dB.

It can be seen that the decoupling assembly 100 can significantly reduce the coupling generated between the first antenna unit 11 and the second antenna unit 12.

Figure 15:
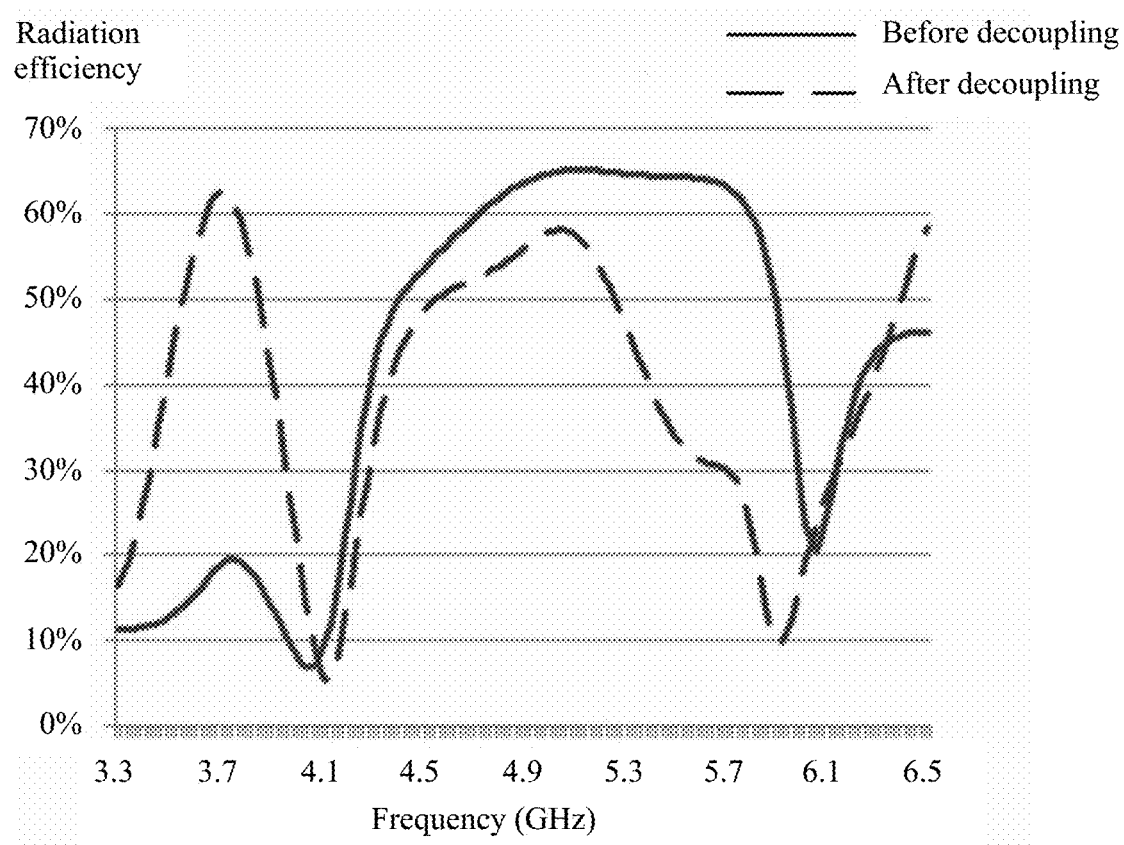
FIG. 15 is a schematic diagram of radiation efficiency of a first antenna unit and a second antenna unit before decoupling and radiation efficiency of the first antenna unit and the second antenna unit after decoupling according to an embodiment of the present invention.

Further, because the coupling between the first antenna unit 11 and the second antenna unit 12 is reduced, the radiation efficiency of the first antenna unit 11 and the second antenna unit 12 may be improved. As shown in FIG. 15, when no decoupling assembly 100 is disposed between the first antenna unit 11 and the second antenna unit 12 (before decoupling), the first antenna unit 11 and the second antenna unit 12 can implement effective radiation (to be specific, radiation efficiency is greater than 50%) only in a single frequency band from 4.4 GHz to 5.9 GHz. After the decoupling assembly 100 is disposed between the first antenna unit 11 and the second antenna unit 12 (after decoupling), the radiation efficiency of the first antenna unit 11 and the second antenna unit 12 is greater than 50% in both two frequency bands from 3.64 GHz to 3.86 GHz and from 4.52 GHz to 5.06 GHz.

It can be seen that for the dual-band multiple-antenna system shown in FIG. 13, the decoupling assembly 100 is disposed between the first antenna unit 11 and the second antenna unit 12 in the antenna pair, so that a coupling between adjacent antenna units can be effectively reduced in a relatively large frequency range, thereby improving radiation efficiency of the antenna units.

Further, an embodiment of the present invention provides a terminal. The terminal may include any multiple-antenna system described in the foregoing embodiments, to reduce a coupling between antenna units in the terminal.

The terminal may be a mobile phone, a tablet computer, a PDA (Personal Digital Assistant, personal digital assistant), or the like. This is not limited in this embodiment of the present invention.

In inclusion, the embodiments of the present invention provide the decoupling assembly, the multiple-antenna system, and the terminal. The multiple-antenna system includes the first antenna unit and the second antenna unit that are adjacent to each other. The decoupling assembly is disposed between the first antenna unit and the second antenna unit, and the decoupling assembly is made of the electromagnetic material with electromagnetic bianisotropy or electrical anisotropy. Based on the electromagnetic bianisotropy or electrical anisotropy, the decoupling assembly may change a radiation direction of an electromagnetic wave at a location of the decoupling assembly, to reduce energy that is of electromagnetic waves radiated by the first antenna unit and the second antenna unit and that is propagated towards a region in which the first antenna unit is located and a region in which the second antenna unit is located, thereby reducing an intersection between radiation regions generated by the two antenna units. In addition, because the decoupling assembly has relatively small dispersion in a relatively large frequency range, in other words, equivalent electromagnetic parameters of the decoupling assembly in the relatively large frequency range are relatively stable, a decoupling effect may be achieved in the relatively large frequency range.

In the descriptions of this specification, the described specific features, structures, materials, or characteristics may be combined in a proper manner in any one or more of the embodiments or examples.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A multiple-antenna system, comprising:
   a first antenna unit and a second antenna unit that are adjacent to each other,
   a decoupling assembly disposed between the first antenna unit and the second antenna unit; and
   the decoupling assembly is made of an electromagnetic material with electrical anisotropy or electromagnetic bianisotropy to reduce a coupling generated between the first antenna unit and the second antenna unit, wherein the decoupling assembly comprises N first decoupling units, and N is an integer greater than 0, and each first decoupling unit comprises an insulated dielectric substrate and at least one closed conductive ring disposed on the dielectric substrate.

2. The multiple-antenna system according to claim 1, wherein
   a plane on which the closed conductive ring is located intersects with a ground plate on which the first antenna unit and the second antenna unit are disposed.

3. The multiple-antenna system according to claim 2, wherein a normal line of the closed conductive ring separately points to the first antenna unit and the second antenna unit.

4. The multiple-antenna system according to claim 2, wherein two adjacent first decoupling units are in contact with each other; and
   a thickness of the dielectric substrate is less than a half of a dielectric wavelength, wherein the dielectric wavelength is a wavelength of an electromagnetic wave that is in the electromagnetic material and that is radiated by the first antenna unit during working, and a working frequency of the first antenna unit is greater than or equal to a working frequency of the second antenna unit.

5. The multiple-antenna system according to claim 4, wherein any side length of the dielectric substrate is less than a half of the dielectric wavelength.

6. The multiple-antenna system according to claim 2, wherein a gap is disposed between two adjacent first decoupling units; and
   a sum of a thickness of the dielectric substrate and a size of the gap is less than a half of a dielectric wavelength, wherein the dielectric wavelength is a wavelength of an electromagnetic wave that is in the electromagnetic material and that is radiated by the first antenna unit during working, and a working frequency of the first antenna unit is greater than or equal to a working frequency of the second antenna unit.

7. The multiple-antenna system according to claim 6, wherein any side length of the dielectric substrate is less than a half of the dielectric wavelength.

8. The multiple-antenna system according to claim 2, wherein the dielectric substrate comprises a first surface opposite to the first antenna unit and a second surface opposite to the second antenna unit, and the closed conductive ring is disposed on the first surface and/or the second surface.

9. The multiple-antenna system according to claim 8, wherein a permittivity of the first antenna unit is equal to a permittivity of the second antenna unit; and
   a permittivity of the first dielectric substrate is greater than the permittivity of the first antenna unit, and a permittivity of the second dielectric substrate is less than the permittivity of the first antenna unit.

10. The multiple-antenna system according to claim 1, wherein the decoupling assembly comprises M second decoupling units, and M is an integer greater than zero; and each second decoupling unit comprises a first dielectric substrate and a second dielectric substrate that are disposed in parallel, a plane on which the first dielectric substrate is located intersects with a ground plate on which the first antenna unit and the second antenna unit are disposed, and a permittivity of the first dielectric substrate is different than a permittivity of the second dielectric substrate.

11. The multiple-antenna system according to claim 1, further comprising:

a ground plate disposed opposite to the decoupling assembly.

12. The multiple-antenna system according to claim 1, further comprising:

a first antenna group and a second antenna group that are symmetrically disposed at two ends of a ground plate, and the first antenna group comprises a third antenna unit, the first antenna unit, the second antenna unit, and a fourth antenna unit that are sequentially arranged along an edge of the ground plate; and the decoupling assembly is disposed between the first antenna unit and the second antenna unit.

13. The multiple-antenna system according to claim 1, further comprising:

four antenna pairs disposed at four vertices of a ground plate, each antenna pair comprises the first antenna unit and the second antenna unit, and the decoupling assembly is disposed between the first antenna unit and the second antenna unit.

14. A terminal comprising:

a multiple-antenna system including:

a first antenna unit and a second antenna unit that are adjacent to each other;

a decoupling assembly disposed between the first antenna unit and the second antenna unit; and the decoupling assembly is made of an electromagnetic material with electrical anisotropy or electromagnetic bianisotropy to reduce a coupling generated between the first antenna unit and the second antenna unit, wherein the decoupling assembly comprises N first decoupling units, and N is an integer greater than 0, and each first decoupling unit comprises an insulated dielectric substrate and at least one closed conductive ring disposed on the dielectric substrate.

15. The terminal according to claim 14, wherein a plane on which the closed conductive ring is located intersects with a ground plate on which the first antenna unit and the second antenna unit are disposed.

16. The terminal according to claim 15, wherein a normal line of the closed conductive ring separately points to the first antenna unit and the second antenna unit.

17. The terminal according to claim 15, wherein two adjacent first decoupling units are in contact with each other; and a thickness of the dielectric substrate is less than a half of a dielectric wavelength, wherein the dielectric wavelength is a wavelength of an electromagnetic wave that is in the electromagnetic material and that is radiated by the first antenna unit during working, and a working frequency of the first antenna unit is greater than or equal to a working frequency of the second antenna unit.

18. The terminal according to claim 14, wherein the decoupling assembly comprises M second decoupling units, and M is an integer greater than zero; and each second decoupling unit comprises a first dielectric substrate and a second dielectric substrate that are disposed in parallel, a plane on which the first dielectric substrate is located intersects with a ground plate on which the first antenna unit and the second antenna unit are disposed, and a permittivity of the first dielectric substrate is different than a permittivity of the second dielectric substrate.

* * * * *